(12) United States Patent
Kusakabe

(10) Patent No.: US 8,670,532 B2
(45) Date of Patent: Mar. 11, 2014

(54) INFORMATION PROCESSING APPARATUS, PROPERTY SETTING METHOD, AND STORAGE MEDIUM

(75) Inventor: Yuki Kusakabe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 2 days.

(21) Appl. No.: 13/471,819

(22) Filed: May 15, 2012

(65) Prior Publication Data

US 2012/0314851 A1 Dec. 13, 2012

(30) Foreign Application Priority Data

Jun. 8, 2011 (JP) ................................. 2011-127909

(51) Int. Cl.
*H04M 11/00* (2006.01)
(52) U.S. Cl.
USPC .................... 379/100.01; 358/400; 379/88.19
(58) Field of Classification Search
USPC ............. 379/100.05, 100.01, 88.19; 358/403, 358/400
See application file for complete search history.

(56) References Cited

U.S. PATENT DOCUMENTS

2011/0007885 A1* 1/2011 Kirchhoff et al. ........ 379/100.17

FOREIGN PATENT DOCUMENTS

JP 2005-304053 A 10/2005

* cited by examiner

*Primary Examiner* — Creighton Smith
(74) *Attorney, Agent, or Firm* — Fitzpatrick, Cella, Harper & Scinto

(57) ABSTRACT

An image forming apparatus stores the received FAX data as a document in a storage unit. The information processing apparatus receives a FAX reception notification which is a notification indicating the reception of FAX data from the image forming apparatus and includes at least a telephone number of a transmission source of the FAX data. Then, the image forming apparatus determines whether or not a new arrival document is present in the storage unit, and sets the telephone number included the FAX reception notification as a property of the new arrival document when the image forming apparatus determines that the new arrival document is present in the storage unit.

15 Claims, 10 Drawing Sheets

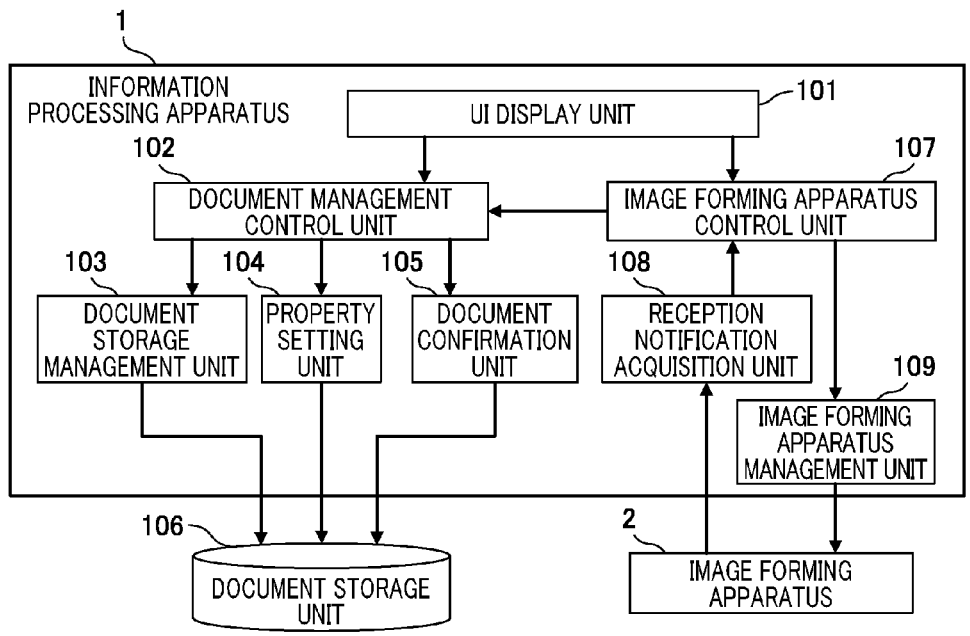

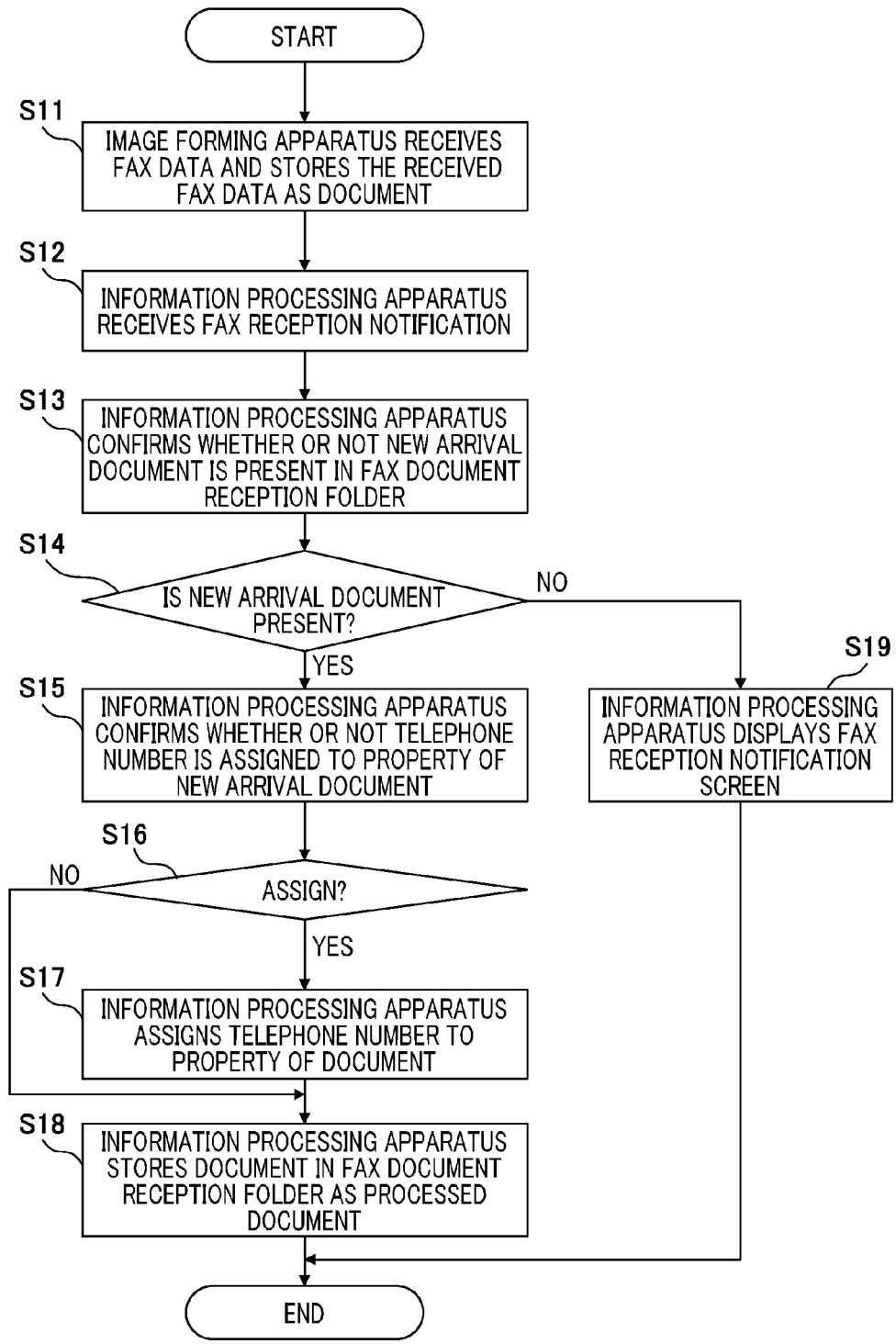

INFORMATION PROCESSING APPARATUS, PROPERTY SETTING METHOD, AND STORAGE MEDIUM

BACKGROUND OF THE INVENTION

1. Field of the Invention

The present invention relates to an information processing apparatus, a property setting method, and a storage medium.

2. Description of the Related Art

Image forming apparatuses (e.g., FAX apparatuses) that receive FAX data, store the received FAX data as electronic data, and set the telephone number of a transmission source of FAX to property information to thereby store and manage the property information have been proposed.

Conventionally, when a telephone number is assigned to property information, a user of an image forming apparatus which has received FAX data has manually specified an individual from the content of the FAX document and assigned his/her telephone number to property information. Image forming apparatuses that receive FAX data and assign the telephone number of a transmission source of FAX to the FAX document itself may also be considered.

Japanese Patent Laid-Open No. 2005-304053 discloses an image forming apparatus (a received document processing apparatus) that receives a document, and sets and stores the name of the document when the telephone number of the transmission source of the received document satisfies a pre-determined condition.

Here, a document management system including an image forming apparatus for receiving FAX data (document), an apparatus (document management apparatus) for managing the document received by the image forming apparatus, and a client apparatus may be considered. The client apparatus is an information processing apparatus that receives a FAX reception notification from the image forming apparatus and acquires a document from the document management apparatus.

However, there are the following problems with the aforementioned document management system. In other words, the conventional image forming apparatus is only capable of assigning a telephone number to a document itself but is incapable of assigning a telephone number to property information of the document managed by the document management apparatus. In order to assign a telephone number to property information carried in the document management apparatus, the image forming apparatus must perform processing depending on the configuration of the individual document management apparatus. However, when a plurality of document management apparatuses is present, it is difficult for the image forming apparatus to perform processing depending on the configuration of the individual document management apparatus. Then, in order to solve the problem, the client apparatus needs to be able to assign the telephone number of a transmission source of FAX to the property of a document received by FAX upon receipt of a FAX reception notification.

SUMMARY OF THE INVENTION

The information processing apparatus of the present invention assigns the telephone number of a transmission source of FAX to the property of a document received by FAX upon receipt of a FAX reception notification.

The information processing apparatus of one aspect of the present invention includes a notification reception unit configured to receive a FAX reception notification which is a notification indicating the reception of FAX data from an image forming apparatus for storing the received FAX data as a document in a storage unit and includes at least a telephone number of a transmission source of the FAX data; a new arrival determination unit configured to determine whether or not a new arrival document is present in the storage unit when the notification reception unit receives the FAX reception notification; and a setting unit configured to display the FAX reception notification when the new arrival determination unit determines that the new arrival document is absent in the storage unit or to set the telephone number included in the FAX reception notification as a property of the new arrival document when the new arrival determination unit determines that the new arrival document is present in the storage unit.

Further features of the present invention will become apparent from the following description of exemplary embodiments with reference to the attached drawings.

BRIEF DESCRIPTION OF THE DRAWINGS

FIG. 3 is an exemplary functional block diagram illustrating an information processing apparatus.

FIG. 4 is a diagram illustrating an example of property information.

FIG. 8 is a flowchart illustrating an example of property assignment processing.

DESCRIPTION OF THE EMBODIMENTS

Figure 1:
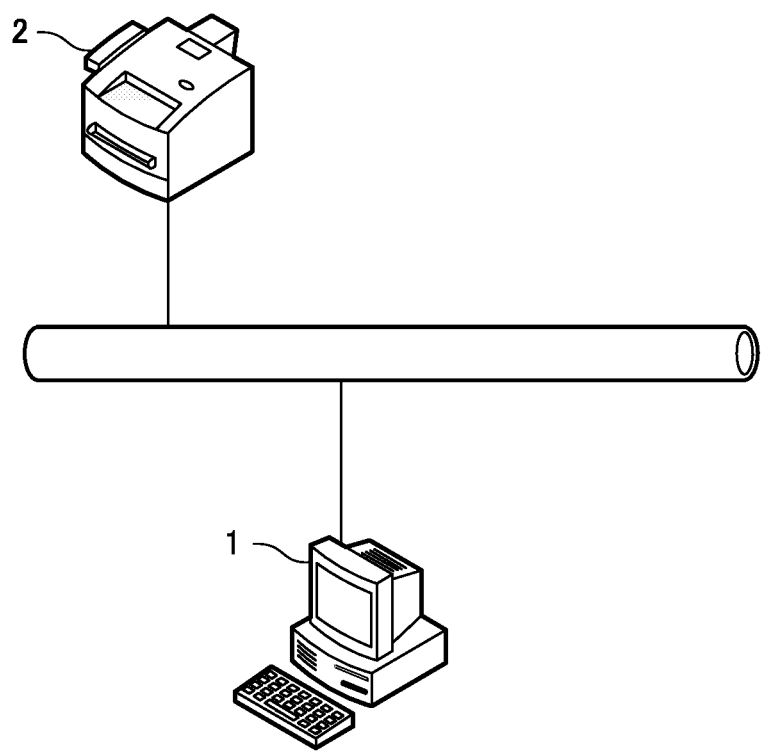
FIG. 1 is a diagram illustrating an example of the system configuration of the present embodiment.

FIG. 1 is a diagram illustrating an example of the system configuration of the present embodiment. The system shown in FIG. 1 includes an information processing apparatus 1 and an image forming apparatus 2. The information processing apparatus 1 and the image forming apparatus 2 are computers that are connected to each other via a command-communicable network. The property setting method of the present embodiment is realized by the information processing apparatus 1 and the image forming apparatus 2.

Figure 2:
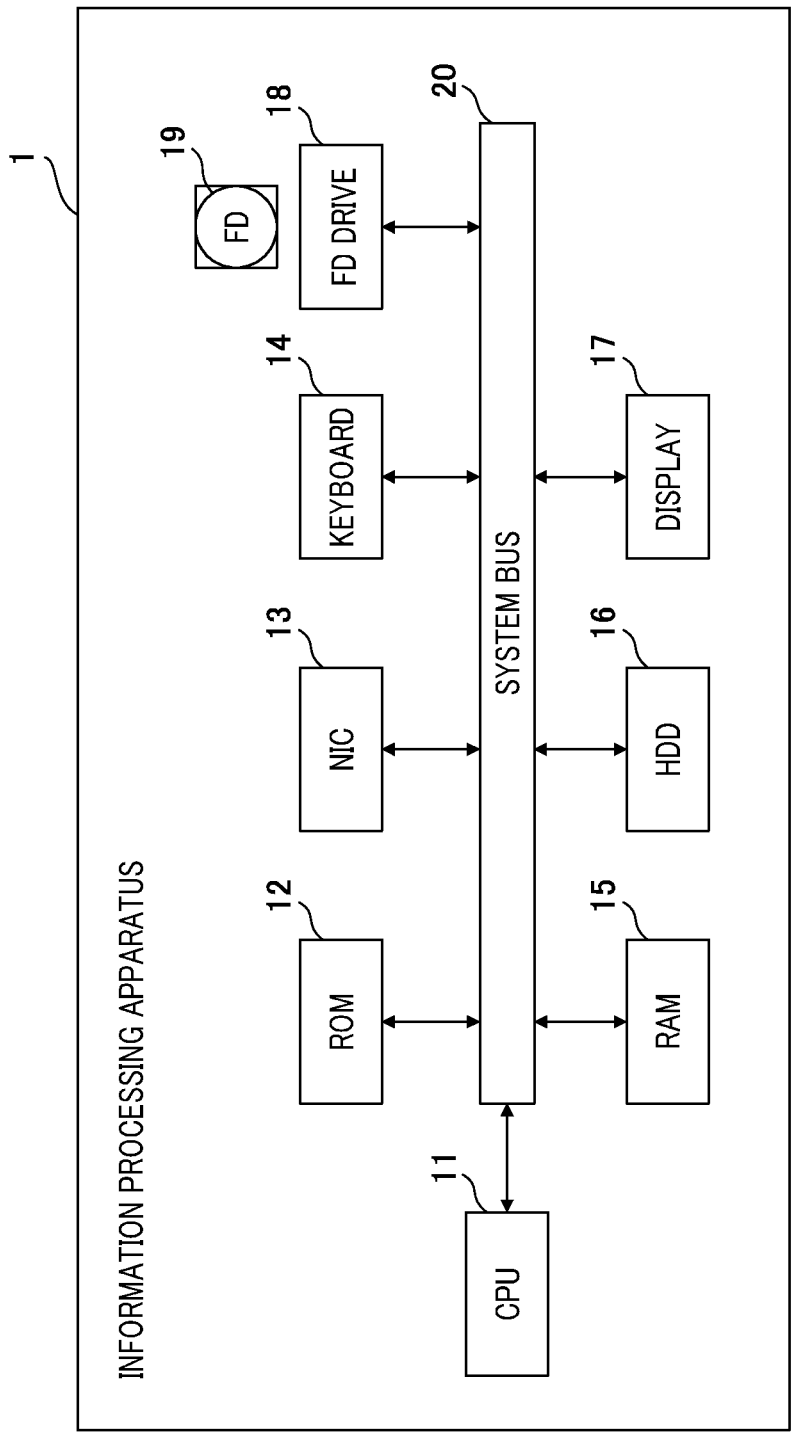
FIG. 2 is a diagram illustrating an example of the hardware configuration of an information processing apparatus.

FIG. 2 is a diagram illustrating an example of the hardware configuration of the information processing apparatus shown in FIG. 1. The information processing apparatus 1 includes a CPU 11, a ROM 12, an NIC 13, and a keyboard 14, where CPU is an abbreviation for Central Processing Unit, ROM is an abbreviation for Read Only Memory, and NIC is an abbreviation for Network Interface Card. The information processing apparatus 1 further includes a RAM 15, an HDD 16, a display 17, and an FD drive 18, where RAM is an abbreviation for Random Access Memory, HDD is an abbreviation for Hard Disk Drive, and FD is an abbreviation for Floppy (registered trademark) Disk. The CPU 11 to the FD drive 18 are connected to each other via a system bus 20.

The CPU 11 controls the overall information processing apparatus 1. For example, the CPU 11 executes an application program, a printer driver program, an OS, a document management program, or the like stored in the HDD 16. The document management program is a computer program that realizes the property setting method of the present embodiment. Also, the CPU 11 controls temporal storage of information, files, or the like required for execution of programs in the RAM 15.

The ROM 12 is a read only memory. The ROM 12 stores programs such as a basic I/O program, font data used for document processing, and various data such as template data in advance. The NIC 13 is a network interface. The information processing apparatus 1 exchanges data with an external device via the NIC 13. The keyboard 14 is an input device that inputs a control command or the like for the document management program running on the information processing apparatus 1 in response to a user's operation. The input device is not limited to a keyboard but may be any device such as a mouse (pointing device), a touch panel, a pen tablet, or the like.

The RAM 15 is a temporary storage unit (memory accessible at anytime). The RAM 15 functions as a main memory, a work area, or the like for the CPU 11. The HDD 16 is one of external storage units. The HDD 16 is a hard disk (HD) that functions as a large-capacity memory and stores an application program, a printer driver program, an OS, a network printer control program, a relational program, or the like. The display 17 is a display unit. The display 17 displays a command input by the keyboard 14, the state of the document management program, or the like.

The FD drive 18 is a floppy (registered trademark) disk (FD) drive serving as a storage medium reading unit. The information processing apparatus 1 is capable of loading programs or the like stored in the FD 19 to the information processing apparatus 1 via the FD drive 18. The FD 19 is a storage medium in which a computer-readable program is stored. The storage medium is not limited to FD but may be any other media such as CD-ROM, CD-R, CD-RW, PC card, DVD, IC memory card, MO, memory stick, or the like. The system bus 20 is a bus that is used to connect components in the information processing apparatus 1 and allows data flow in the information processing apparatus 1.

FIG. 3 is an exemplary functional block diagram illustrating the information processing apparatus shown in FIG. 1. The processing units provided in the information processing apparatus 1 shown in FIG. 3 are realized by the function of the document management program running on the information processing apparatus 1.

The information processing apparatus 1 includes an UI display unit 101, a document management control unit 102, a document storage management unit 103, a property setting unit 104, a document confirmation unit 105, and a document storage unit 106. The information processing apparatus 1 further includes an image forming apparatus control unit 107, a reception notification acquisition unit 108, and an image forming apparatus management unit 109.

The UI display unit 101 displays a UI (User Interface) for inputting a command by a user of the information processing apparatus 1 via the keyboard 14. The UI display unit 101 also displays the results of processing by the document management program on the display 17. The document management control unit 102 manages the overall processing for a document stored in the document storage unit 106. The document management control unit 102 instructs the document storage management unit 103 to store a document in the document storage unit 106. In this manner, a document is stored in the document storage unit 106. The document storage unit 106 is a storage unit that stores a document. In this example, the document storage unit 106 is a part of the HDD 16. A document storage destination is not limited to the HDD 16 but may be the FD 19 or a storage unit on a server (not shown). The property setting unit 104 manages property information of a document stored in the document storage unit 106.

FIG. 4 is a diagram illustrating an example of property information. Property information 401 is an exemplary structure of property information assigned to a document. One or more property information is assigned to one document, and the property information is managed by the property setting unit 104. Examples of information defined in the property information 401 include a document name 402, a document storage location 403, a document property 404, and the like. In this example, the telephone number of a transmission source of the document, i.e., the telephone number of a transmission source of FAX is stored in the document property 404. In the following description, a transmission source of FAX is also described as a transmission source of FAX data. The property setting unit 104 sets a property display name 405 or a property value 406 in the document property 404 shown in FIG. 4 in accordance with an instruction given by the document management control unit 102. In this example, XML format is used as a property storage format but other languages may also be used.

Referring back to FIG. 3, the document confirmation unit 105 confirms whether or not a new arrival document is present in the document storage unit 106. The new arrival document is a document that is newly stored in the document storage unit 106. The document confirmation unit 105 may confirm the presence of a new arrival document by periodically monitoring the document storage unit 106 or may acquire a new arrival document notification event from an OS in cooperation with the HDD 16 to thereby confirm the presence of a new arrival document based on the new arrival document notification event.

The image forming apparatus control unit 107 communicates with the image forming apparatus 2 via the image forming apparatus management unit 109 and manages the state of an apparatus and the state of a job to be notified from the image forming apparatus 2. For example, the image forming apparatus control unit 107 manages information indicating whether or not the image forming apparatus 2 has a function of providing a job reception notification in advance. The image forming apparatus management unit 109 receives an instruction from the image forming apparatus control unit 107 and communicates with the image forming apparatus 2 in accordance with the instruction.

The reception notification acquisition unit 108 receives a FAX reception notification from the image forming apparatus 2 via the image forming apparatus management unit 109. The FAX reception notification is a notification indicating the reception of FAX data and includes at least the telephone number of a transmission source of FAX data. The FAX reception notification includes, for example, a FAX received time, a received device name, a transmission source telephone number, information regarding a receive line, a document created date/time, or the like. The FAX received time is, for example, a date/time upon receipt of FAX by the image forming apparatus 2. The received device name is the name of the image forming apparatus 2 which has received FAX. The transmission source telephone number is the telephone number of a transmission source of FAX data. The document created date/time is a date/time when FAX data corresponding to the FAX reception notification is created as a document, i.e., a date/time when the image forming apparatus 2 creates FAX data as a document. The FAX received time may be a date/time upon reception of the FAX reception notification from the image forming apparatus 2 by the information processing apparatus 1. Although FAX is typically received using a publicly switched telephone network, the present invention is not limited to a publicly switched telephone network, but the I-FAX over a next generation network or a protocol such as a small mail transfer protocol (SMTP) may also be used. In this example, it is assumed that a notification is provided for all reception.

Figure 5:
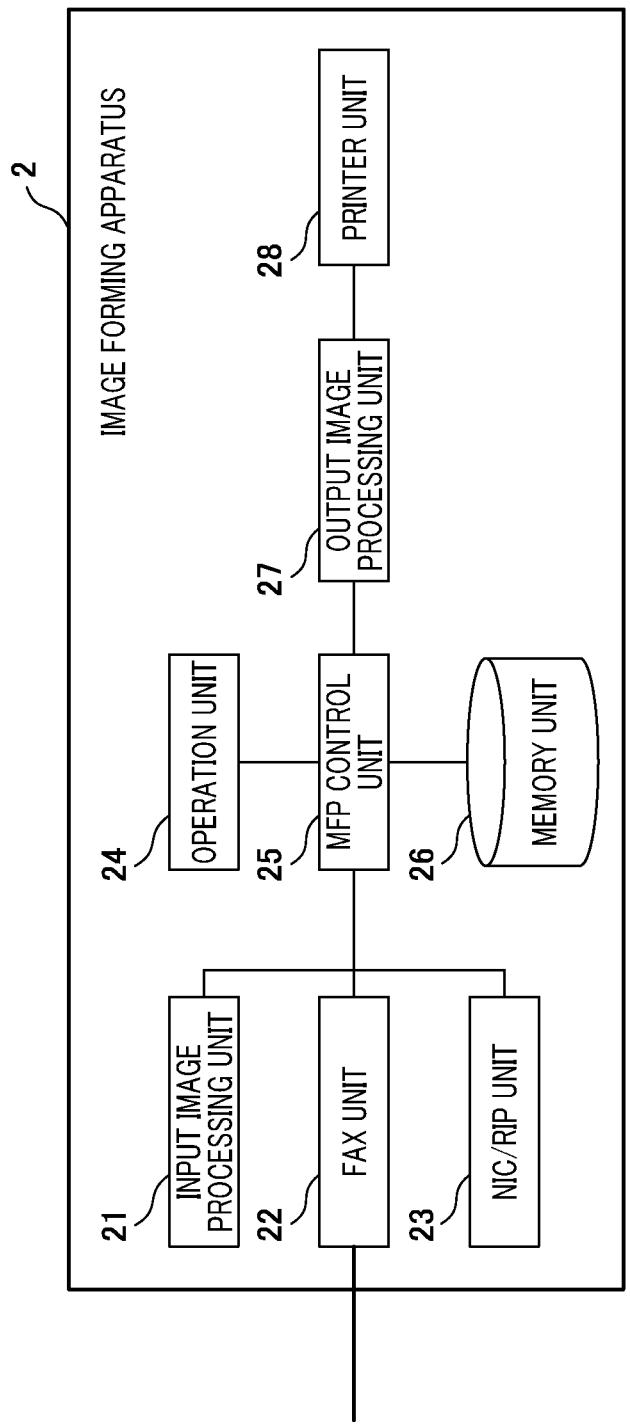
FIG. 5 is an exemplary functional block diagram illustrating an image forming apparatus.

FIG. 5 is an exemplary functional block diagram illustrating an image forming apparatus. The image forming apparatus 2 includes an input image processing unit 21, a FAX unit 22, an NIC/RIP unit 23, an operation unit 24, an MFP control unit 25, a memory unit 26, an output image processing unit 27, and a printer unit 28.

The input image processing unit 21 reads an original paper sheet or the like using an image reading device such as a scanner, and performs image processing for the read image data. The FAX unit 22 performs transmission/reception of an image using a telephone line represented by a facsimile or the like. The NIC/RIP unit 23 includes an NIC unit and an RIP unit, where NIC is an abbreviation for Network Interface Card and RIP is an abbreviation for Raster Image Processor.

The NIC unit passes image data (e.g., PDL data) input via a network to the RIP unit or transmits image data or apparatus information held by the image forming apparatus 2 to the outside via a network. The RIP unit decodes the input PDL (Page Description Language) data and rasterizes the PDL data using the RIP.

The MFP control unit 25 controls the input of data to the image forming apparatus 2 or the output of data from the image forming apparatus 2 in response to an instruction given by the operation unit 24. The MFP control unit 25 temporarily stores image data input to the image forming apparatus 2 in the memory unit 26. The MFP control unit 25 calls image data stored in the memory unit 26 as appropriate and passes the image data to the output image processing unit 27.

The output image processing unit 27 performs image processing for image data received from the MFP control unit 25 and sends the processed image data to the printer unit 28 for printout. The printer unit 28 feeds paper sheets and sequentially prints image data on paper sheets. The operation unit 24 provides an instruction to the MFP control unit 25 in accordance with the operation of a user of the image forming apparatus 2.

Figure 6:
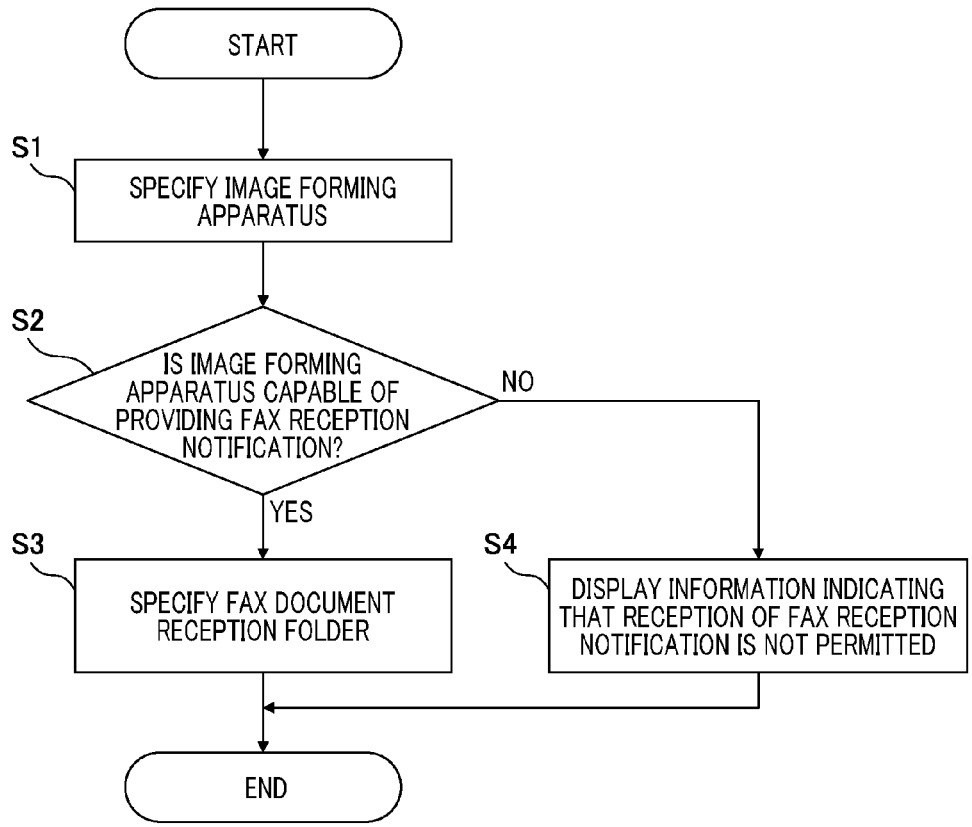
FIG. 6 is a flowchart illustrating an example of FAX reception setting processing.

FIG. 6 is a flowchart illustrating an example of FAX reception setting processing according to a first embodiment of the present invention. Processing shown in the flowchart of FIG. 6 is realized by execution of the document management program stored in the HDD 16 by the CPU 11 (FIG. 2).

Firstly, the UI display unit 101 provided in the information processing apparatus 1 displays a FAX reception setting UI. Then, the document management control unit 102 specifies the image forming apparatus 2 in response to a user's operation on the FAX reception setting UI (step S1).

Figure 7:
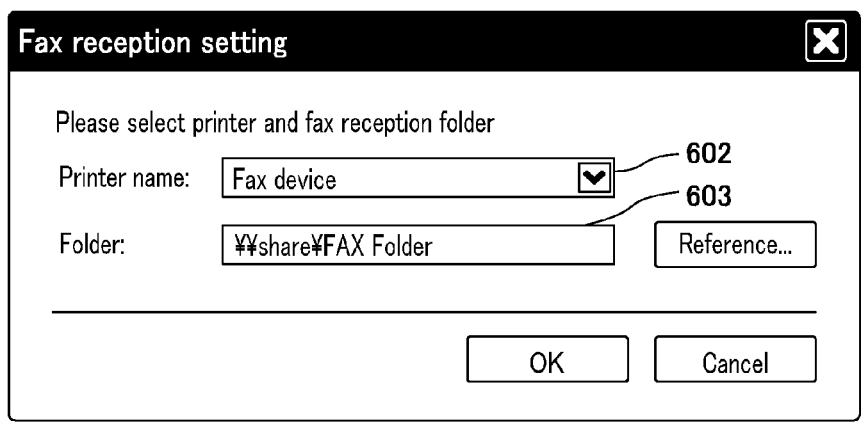
FIG. 7 is a diagram illustrating an example of a FAX reception setting UI.

FIG. 7 is a diagram illustrating an example of a FAX reception setting UI. In a dialogue 601, the FAX reception setting UI has a box 602 for selecting an image forming apparatus and a box 603 for specifying a FAX document reception folder. The FAX document reception folder is a storage unit and is a folder in which the document received by FAX (FAX document) is stored. The FAX document reception folder is provided in the document storage unit 106.

Next, the image forming apparatus control unit 107 determines whether or not the image forming apparatus 2 specified in step S1 is an image forming apparatus capable of providing a FAX reception notification based on information indicating whether or not the image forming apparatus 2 has a function of providing a job reception notification (step S2). The FAX reception notification is a notification indicating the reception of FAX data.

When the image forming apparatus 2 specified in step S1 is not an image forming apparatus capable of providing a FAX reception notification, the process advances to step S4. Then, the UI display unit 101 displays information indicating that reception of a FAX reception notification is not permitted on the display 17 (step S4).

When the image forming apparatus 2 specified in step S1 is an image forming apparatus capable of providing a FAX reception notification, the process advances to step S3. Then, the UI display unit 101 specifies a FAX document reception folder in response to a user's operation on the FAX reception setting UI (FIG. 7) (step S3).

FIG. 8 is a flowchart illustrating an example of processing for assigning properties to a FAX reception document according to the first embodiment. Firstly, the image forming apparatus 2 receives FAX data and stores the received FAX data as a document (step S11). In step S11, the image forming apparatus 2 further provides a FAX reception notification to the information processing apparatus 1.

Next, the document management control unit 102 of the information processing apparatus 1 functions as a notification reception unit that receives a FAX reception notification (step S12). The FAX reception notification includes the telephone number of a transmission source of FAX. Next, the document confirmation unit 105 confirms whether or not a new arrival document is present in a FAX document reception folder (step S13).

Figure 9A:
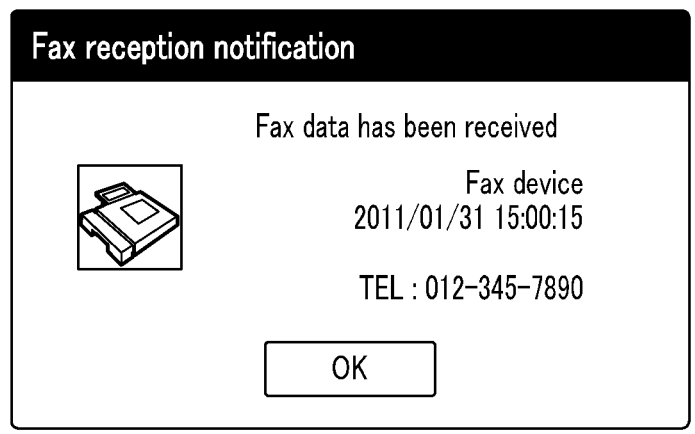
FIGS. 9A and 9B are examples of a FAX reception notification screen.

Next, the document management control unit 102 functions as a new arrival determination unit that determines whether or not a new arrival document is present in a FAX document reception folder based on the results of confirmation processing in step S13 (step S14). When a new arrival document is absent in a FAX document reception folder, the document management control unit 102 instructs the UI display unit 101 to display a FAX reception notification screen (step S19). The FAX reception notification screen is a screen that displays a FAX reception notification. FIG. 9A shows an exemplary FAX reception notification screen to be displayed.

Figure 9B:
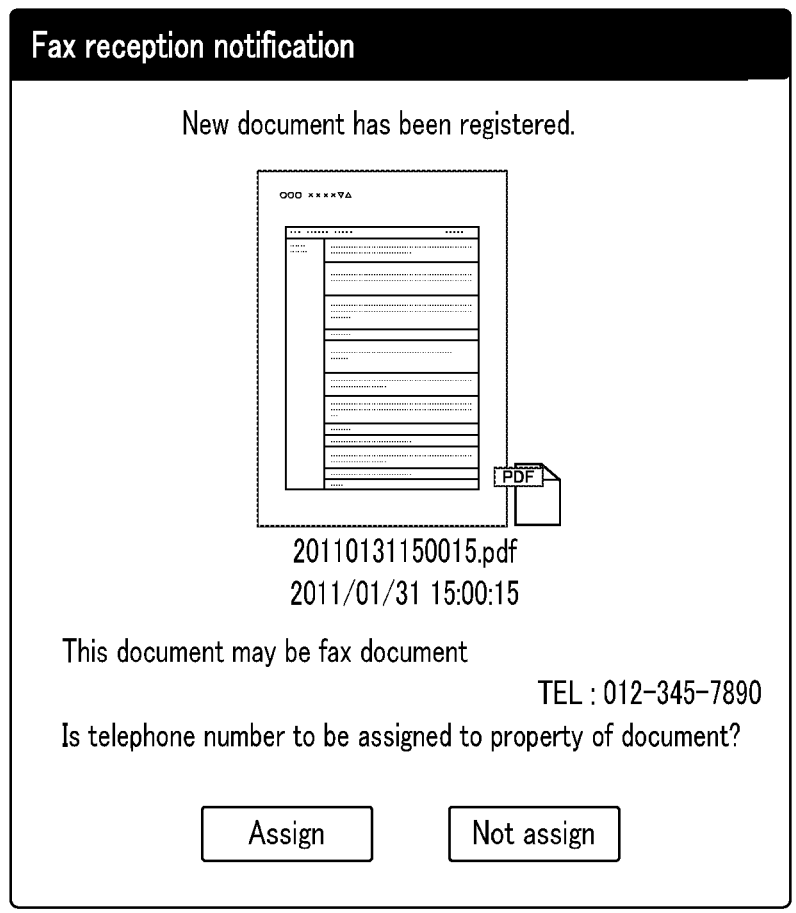

When a new arrival document is present in a FAX document reception folder, the document management control unit 102 confirms a user as to whether or not the telephone number of a transmission source of FAX corresponding to a new arrival document is assigned to the property of the new arrival document (step S15). More specifically, the document management control unit 102 instructs the UI display unit 101 to display a FAX reception notification screen shown in FIG. 9B. The document management control unit 102 queries a user of the information processing apparatus 1 as to whether or not the telephone number of a transmission source of FAX is assigned to the property of the new arrival document through display of a FAX reception notification screen. The FAX reception notification screen includes information indicating a new arrival document and the telephone number of a transmission source of FAX. When a user who sees the FAX reception notification screen assigns the telephone number to the property of the new arrival document, the user selects the box "assign" on the FAX reception notification screen. When a user does not assign the telephone number to the property of the new arrival document, the user selects the box "not assign" on the FAX reception notification screen.

Next, the document management control unit 102 determines whether or not the telephone number is assigned to the property of the new arrival document in response to a user's selection operation on the FAX reception notification screen (step S16). When the document management control unit 102 determines that the telephone number is not assigned to the property of the new arrival document, the process advances to step S18. When the document management control unit 102 determines that the telephone number is assigned to the property of the new arrival document, the document management control unit 102 assigns the telephone number to the property of the new arrival document via the property setting unit 104 (step S17). In other words, when the document management control unit 102 determines that a new arrival document is present in a FAX document reception folder, the document management control unit 102 and the property setting unit 104 collectively function as a setting unit that sets the telephone number included in the FAX reception notification as the property of the new arrival document. The document management control unit 102 sets the telephone number of a transmission source of FAX as the property of the new arrival document in response to the query result in step S15 granted to a user. Then, the document storage management unit 103 stores the new arrival document in the FAX document reception folder as a processed document (step S18). The processed document is not recognized as a new arrival document.

According to the information processing apparatus of the first embodiment, the telephone number of a transmission source of FAX can be assigned to the property of a document received by FAX. In other words, even when an image forming apparatus is incompatible with an apparatus (or processing unit) that manages a document received by FAX, the information processing apparatus itself can assign the telephone number to the property of the document.

Figure 10:
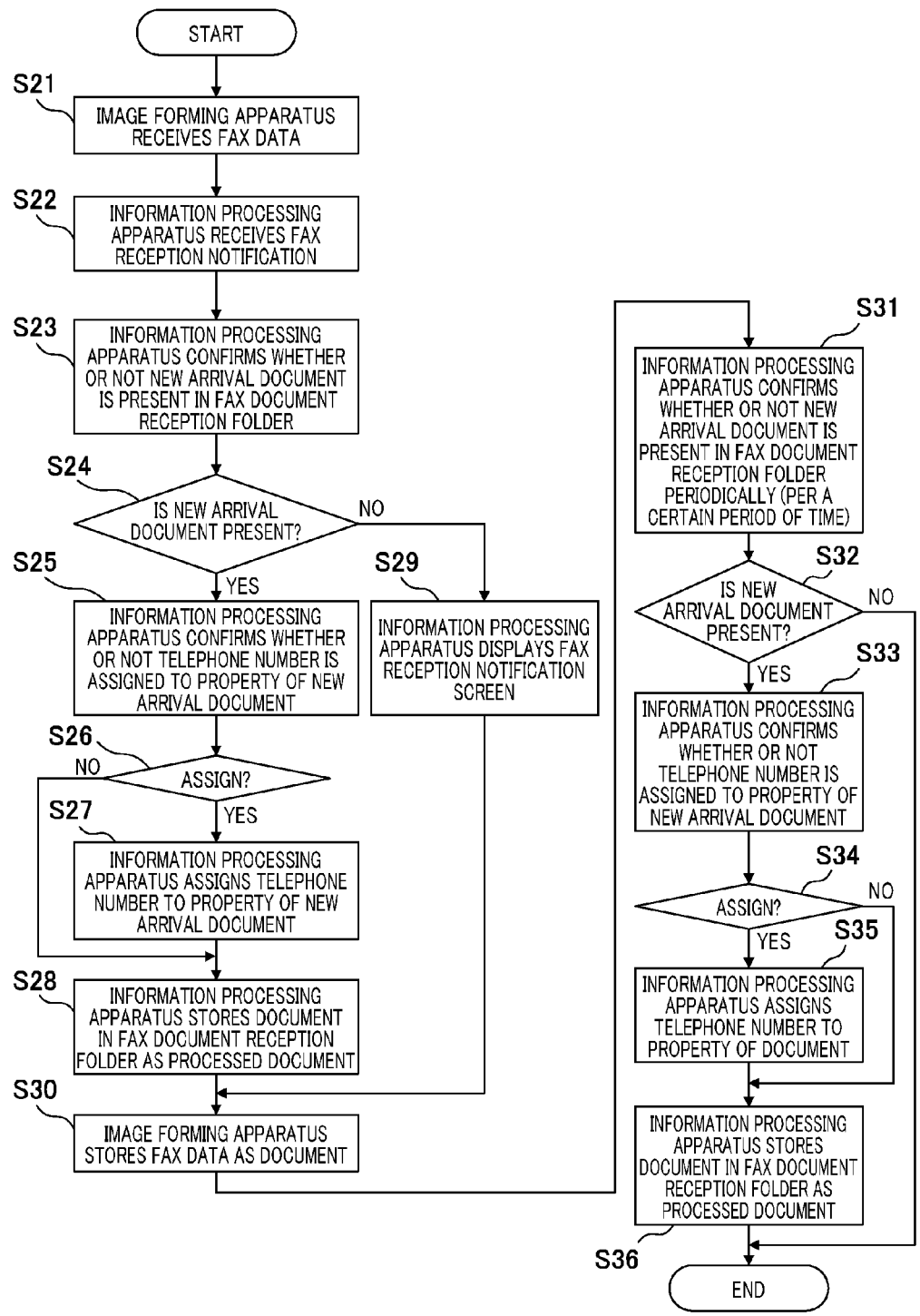
FIG. 10 is a flowchart illustrating an example of property assignment processing.

FIG. 10 is a flowchart illustrating an example of processing for assigning properties to a FAX reception document according to a second embodiment. The process in step S22 shown in FIG. 10 is the same as that in step S12 shown in FIG. 8. The processes in steps S23 to S29 shown in FIG. 10 are the same as those in steps S13 to S19 shown in FIG. 8. Also, the processes in steps S32 to S36 shown in FIG. 10 are the same as those in steps S14 to S18 shown in FIG. 8.

In step S21 shown in FIG. 10, the image forming apparatus 2 receives FAX data (step S21), and provides a FAX reception notification to the information processing apparatus 1. After the elapse of any time interval or a predetermined time period after the provision of a FAX reception notification, the image forming apparatus 2 stores FAX data as a FAX reception document in a FAX document reception folder.

When it is determined in step S24 that a new arrival document is absent in a FAX document reception folder, that is, when the document management control unit 102 receives a FAX reception notification before the FAX reception document is stored in the FAX document reception folder, the process advances to step S29. Then, the document management control unit 102 instructs the UI display unit 101 to display a FAX reception notification screen (step S29), and the process advances to step S30.

After displaying the FAX reception notification, the image forming apparatus 2 stores FAX data as a document (step S30). The document management control unit 102 of the information processing apparatus 1 determines whether or not a new arrival document is present in the FAX document reception folder periodically (per a certain period of time) (step S31), and the process advances to step S32. Then, when the document management control unit 102 determines that a new arrival document is present in the FAX document reception folder (Yes in step S32), the document management control unit 102 sets the telephone number of a transmission source of FAX as the property of the new arrival document using the determination as a trigger (step S35).

According to the information processing apparatus 1 of the second embodiment, even when a new arrival document is stored in a FAX document reception folder by the image forming apparatus 2 after receiving a FAX reception notification from the image forming apparatus 2, a property can be assigned to the new arrival document.

Figure 11:
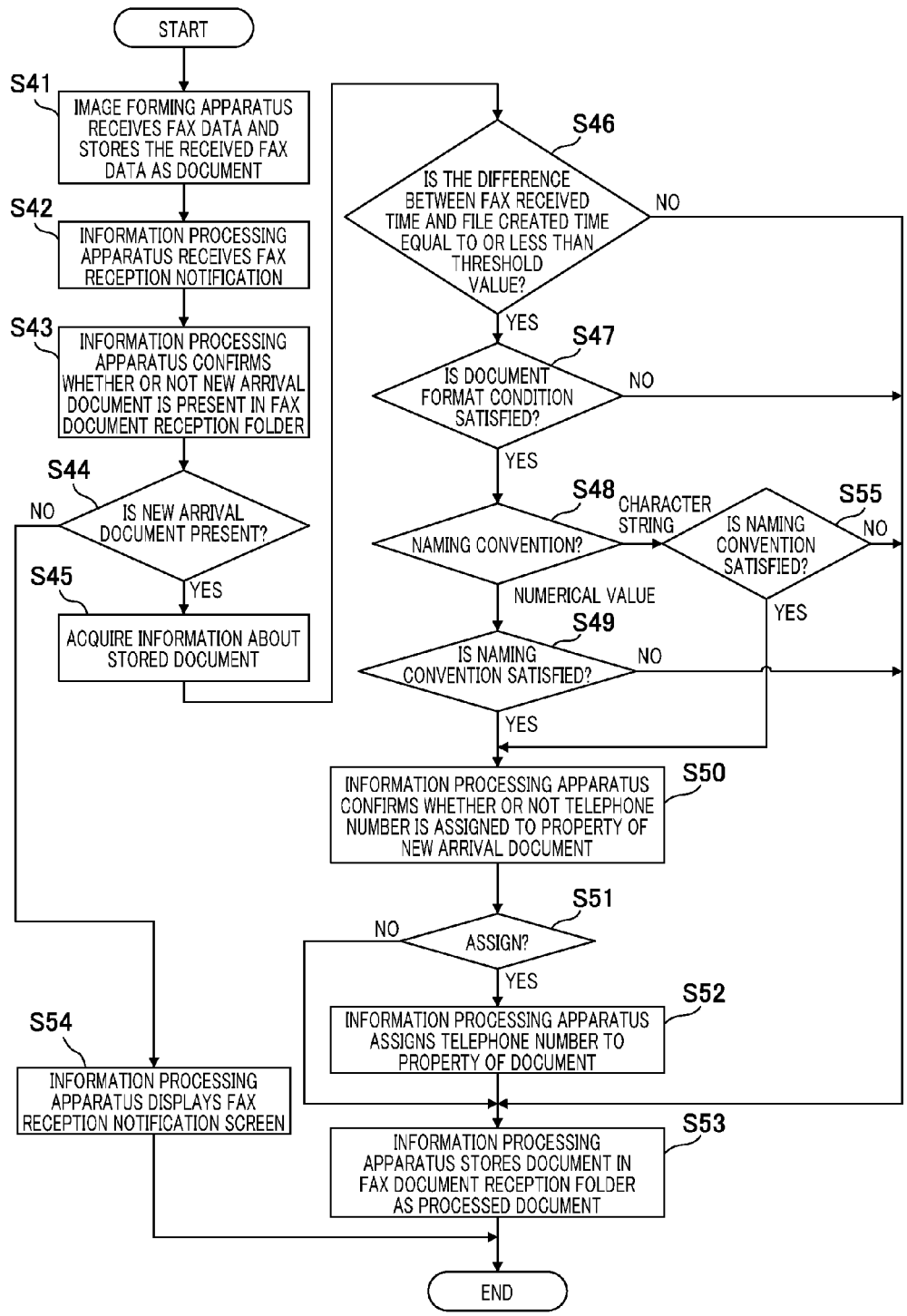
FIG. 11 is a flowchart illustrating an example of property assignment processing.

FIG. 11 is a flowchart illustrating an example of processing for assigning properties to a FAX reception document according to a third embodiment. The processes in steps S41 to S44 shown in FIG. 11 are the same as those in steps S11 to S14 shown in FIG. 8. The process in step S54 shown in FIG. 11 is the same as that in step S19 shown in FIG. 8. Also, the processes in steps S50 to S53 shown in FIG. 11 are the same as those in steps S15 to S18 shown in FIG. 8.

In the third embodiment, when the document management control unit 102 determines that a new arrival document is present in a FAX document reception folder (Yes in step S44), the document management control unit 102 executes the following processing. The document management control unit 102 acquires information relating to a document newly stored in the FAX document reception folder, i.e., a new arrival document (step S45). In the present embodiment, the FAX reception notification includes the telephone number of a transmission source of FAX, a FAX received time, and a created time of a file of a new arrival document (a new arrival document file). The created time of a new arrival document file is, for example, a date/time upon creation of a new arrival document file. Thus, in step S45, the document management control unit 102 acquires the telephone number and the created time of the new arrival document file, which are included in the FAX reception notification. The document management control unit 102 also acquires the format of the new arrival document file and the file name of the new arrival document file. In step S45, the document management control unit 102 further acquires information specified on the property assignment specification UI shown in FIG. 12.

Figure 12:
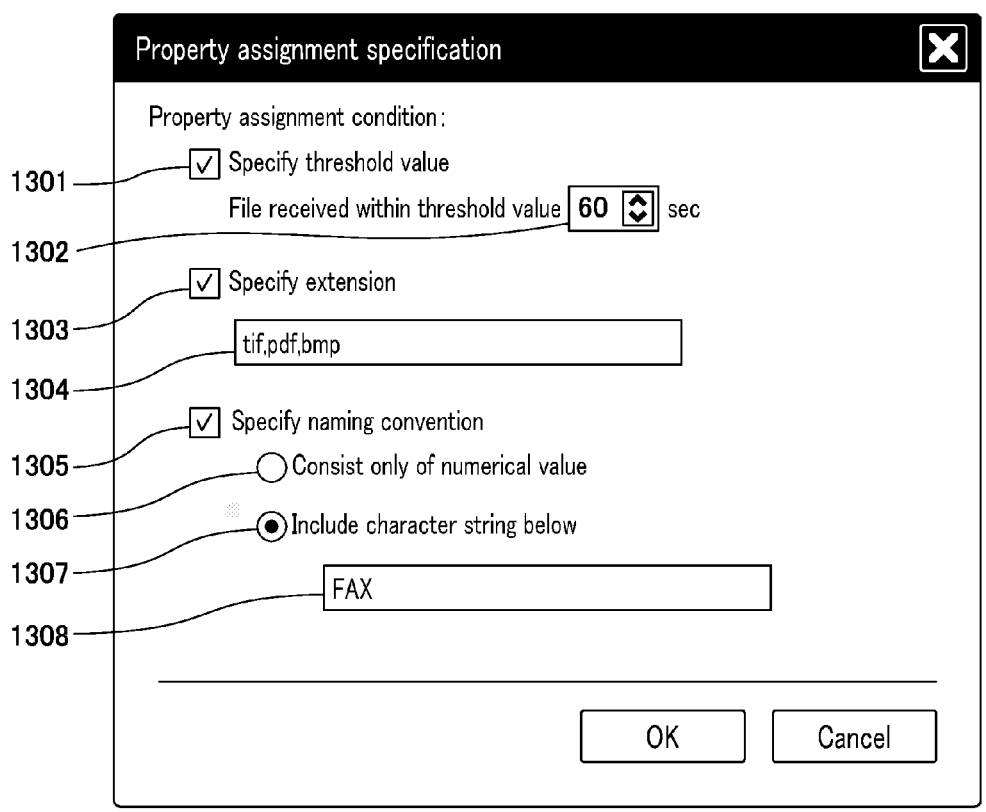
FIG. 12 is a diagram illustrating an example of a property assignment specification UI.

FIG. 12 is a diagram illustrating an example of a property assignment specification UI. The property assignment specification UI is a UI for specifying a threshold value, a document format, and a file naming convention. The UI display unit 101 displays a property assignment specification UI and specifies a threshold value, a document format condition, and a file naming convention in response to a user's specifying operation on the displayed property assignment specification UI. The threshold value is a threshold value relating to the difference between a FAX received time and a new arrival document file created time.

When the difference between a new arrival document file created time and a FAX received time falls below a specified threshold value, the information processing apparatus 1 determines that the new arrival document is not a FAX reception document. When the difference between a new arrival document file created time and a FAX received time does not fall below a specified threshold value, the information processing apparatus 1 determines that the new arrival document is not a FAX reception document. The document format condition is a condition relating to the format of a new arrival document. The file naming convention is a convention relating to the file name of a new arrival document.

A check box 1301 included in the property assignment specification UI specifies whether or not a threshold value is specified. When a user specifies a threshold value, the user specifies a threshold value in a spin box 1302. A check box 1303 specifies whether or not a document format is specified. When a user specifies a document format, the user describes an extension in a text box 1304. In this example, extensions tif, pdf, and bmp are described. The document format condition is that a document file has an extension(s) described in the text box 1304.

A check box 1305 specifies whether or not a file naming convention is specified. When a user specifies a file naming convention, the user performs the following operation. When a user specifies a file naming convention in which a file name consists only of numerical values, the user specifies a radio button 1306. When a user specifies a file naming convention in which a file name includes a predetermined character string, the user specifies a radio button 1307 and specifies a character string to be included in the file name in a text box 1308.

Referring back to FIG. 11, the document management control unit 102 executes the following processing in steps S46, S47, S48, S49, and S55 based on information acquired in step S45. The document management control unit 102 determines whether or not the difference between a FAX received time and a new arrival document file created time is equal to or less than the threshold value specified by the property assignment specification UI (step S46). When the difference between a FAX received time and a new arrival document file created time is not equal to or less than the threshold value, the process advances to step S53. In other words, in this case, the document management control unit 102 determines that the new arrival document is not a FAX reception document but is a document stored in a FAX document reception folder due to other factors other than FAX reception, and does not assign a telephone number to the property of the new arrival document.

When the difference between a FAX received time and a new arrival document file created time is equal to or less than the threshold value, the process advances to step S47. Next, the document management control unit 102 determines whether or not the format of the new arrival document file is a predetermined format, that is, the format of the new arrival document file satisfies the document format condition specified by the property assignment specification UI (step S47).

In the example of the property assignment specification UI shown in FIG. 12, extensions tif, pdf, and bmp are described in the text box 1304. Thus, the document management control unit 102 determines whether or not the extension of the new arrival document file is any one of tif, pdf, and bmp. Then, when the extension of the new arrival document file is any one of tif, pdf, and bmp, the document management control unit 102 determines that the format of the new arrival document file satisfies the document format condition specified by the property assignment specification UI. When the extension of the new arrival document file is not any one of tif, pdf, and bmp, the document management control unit 102 determines that the format of the new arrival document file does not satisfy the document format condition specified by the property assignment specification UI.

When the document management control unit 102 determines that the format of the new arrival document file does not satisfy the document format condition specified by the property assignment specification UI, the process advances to step S53. In other words, in this case, the document management control unit 102 determines that the new arrival document file is not stored in a format which can be created by the image forming apparatus 2, that is, the new arrival document file is not a FAX reception document, and does not assign a telephone number to the property of the new arrival document. When the document management control unit 102 determines that the format of the new arrival document file satisfies the document format condition specified by the property assignment specification UI, the process advances to step S48.

In steps S48, S49, and S55, the document management control unit 102 determines whether or not the file name of the new arrival document file satisfies a predetermined condition. In other words, the document management control unit 102 determines whether or not the file name satisfies the file naming convention specified on the property assignment specification UI.

In step S48, the document management control unit 102 determines whether or not the specified file naming convention is either that the file name consists only of numerical values or that the file name includes a predetermined character string (step S48). When the specified file naming convention is that the file name consists only of numerical values, the process advances to step S49. When the specified file naming convention is that the file name includes a predetermined character string, the process advances to step S55.

In step S49, the document management control unit 102 determines whether or not the file name of the new arrival document file satisfies the file naming convention, that is, the file name of the new arrival document file consists only of numerical values (step S49). When the file name of the new arrival document file consists only of numerical values, the process advances to step S50. When the file name of the new arrival document file does not consist only of numerical values, the process advances to step S53.

In step S55, the document management control unit 102 determines whether or not the file name of the new arrival document file satisfies the file naming convention, that is, the file name of the new arrival document file includes a specified character string (step S49). On the property assignment specification UI shown in FIG. 12, the character string "FAX" is specified in the text box 1308 as a character string to be included in the file name. Thus, the document management control unit 102 determines, for example, whether or not the file name of the new arrival document file includes a character string "FAX". When the file name of the new arrival document file includes a specified character string, the process advances to step S50. When the file name of the new arrival document file does not include a specified character string, the process advances to step S53.

According to the information processing apparatus 1 of the third embodiment, when the image forming apparatus 2 has stored a document other than a FAX document in a FAX document reception folder, the assignment of a telephone number to the document other than the FAX document may be prevented.

According to the information processing apparatus of the present invention described with reference to the aforementioned embodiments, the telephone number of a transmission source of FAX can be assigned to the property of a document received by FAX. In other words, even when an image forming apparatus is incompatible with an apparatus (or processing unit) that manages a document received by FAX, the information processing apparatus itself can assign the telephone number to the property of the document.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-127909 filed on Jun. 8, 2011, which is hereby incorporated by reference herein in its entirety.

What is claimed is:

1. An information processing apparatus comprising:
   a notification reception unit configured to receive a FAX reception notification which is a notification indicating the reception of FAX data from an image forming apparatus for storing the received FAX data as a document in a storage unit and includes at least a telephone number of a transmission source of the FAX data;
   a new arrival determination unit configured to determine whether or not a new arrival document is present in the storage unit when the notification reception unit receives the FAX reception notification; and
   a setting unit configured to display the FAX reception notification when the new arrival determination unit determines that the new arrival document is absent in the storage unit or to set the telephone number included in the FAX reception notification as a property of the new arrival document when the new arrival determination unit determines that the new arrival document is present in the storage unit,
   wherein the setting unit queries a user of the information processing apparatus as to whether or not the telephone number included in the FAX reception notification is set as a property of the new arrival document when the new arrival determination unit determines that a new arrival document is present in the storage unit, and sets the telephone number as a property of the new arrival document depending on the results of the query.

2. The information processing apparatus according to claim 1, wherein the new arrival determination unit periodically determines whether or not a new arrival document is present in the storage unit, and
   wherein, when the new arrival determination unit determines that the new arrival document is present in the storage unit, the setting unit sets the telephone number included in the FAX reception notification as a property of the new arrival document using the determination as a trigger.

3. The information processing apparatus according to claim 1, wherein the FAX reception notification further includes a created date/time which is a date/time upon creation of the FAX data corresponding to the FAX reception notification as a document, and
   wherein the setting unit further determines whether or not a difference between a date/time upon receipt of the FAX reception notification by the notification reception unit and a date/time upon creation of the new arrival document included in the FAX reception notification is equal to or less than a predetermined threshold value when the new arrival determination unit determines that the new arrival document is present in the storage unit, and sets the telephone number included in the FAX reception notification as a property of the new arrival document when the difference between a date/time upon receipt of the FAX reception notification and a date/time upon creation of the new arrival document is equal to or less than the threshold value.

4. The information processing apparatus according to claim 3, wherein the setting unit determines whether or not a file format of the new arrival document is a predetermined format when the difference between a date/time upon receipt of the FAX reception notification by the notification reception unit and a date/time upon creation of the new arrival document included in the FAX reception notification is equal to or less than a predetermined threshold value, and sets the telephone number included in the FAX reception notification as a property of the new arrival document when the file format of the new arrival document is the predetermined format.

5. The information processing apparatus according to claim 4, wherein the setting unit determines whether or not a file name of the new arrival document satisfies a predetermined condition when a file format of the new arrival document is a predetermined format, and sets the telephone number included in the FAX reception notification as a property of the new arrival document when the file name of the new arrival document satisfies the predetermined condition.

6. A property setting method comprising:
   receiving, in a storage step performed by an image forming apparatus, FAX data and storing the received FAX data in a storage unit;
   transmitting, in a transmission step performed by the image forming apparatus, a FAX reception notification which is a notification indicating the reception of the FAX data and includes at least a telephone number of a transmission source of the FAX data to an information processing apparatus;
   receiving, in a notification reception step performed by the information processing apparatus, the FAX reception notification from the image forming apparatus;
   determining, in a new arrival determination step performed by the information processing apparatus, whether or not a new arrival document is present in the storage unit when the FAX reception notification is received from the image forming apparatus; and
   displaying, in a setting step performed by the information processing apparatus, the FAX reception notification when it is determined that the new arrival document is absent in the storage unit or setting the telephone number included in the FAX reception notification as a property of the new arrival document when it is determined that the new arrival document is present in the storage unit,
   wherein, in the setting step, a query is made to a user of the information processing apparatus as to whether or not the telephone number included in the FAX reception notification is set as a property of the new arrival document when it is determined in the new arrival determination step that a new arrival document is present in the storage unit, and the telephone number is set as a property of the new arrival document depending on the results of the query.

7. The property setting method according to claim 6, wherein, in the new arrival determination step, it is periodically determined whether or not a new arrival document is present in the storage unit, and
   wherein, when it is determined in the new arrival determination step that the new arrival document is present in the storage unit, the telephone number included in the FAX reception notification is set as a property of the new arrival document in the setting step using the determination as a trigger.

8. The property setting method according to claim 6, wherein the FAX reception notification further includes a created date/time which is a date/time upon creation of the FAX data corresponding to the FAX reception notification as a document, and wherein, in the setting step, it is further determined whether or not a difference between a date/time upon receipt of the FAX reception notification in the notification reception step and a date/time upon creation of the new arrival document included in the FAX reception notification is equal to or less than a predetermined threshold value when it is determined in the new arrival determination step that the new arrival document is present in the storage unit, and the telephone number included in the FAX reception notification is set as a property of the new arrival document when the difference between a date/time upon receipt of the FAX reception notification and a date/time upon creation of the new arrival document is equal to or less than the threshold value.

9. The property setting method according to claim 8, wherein, in the setting step, it is determined whether or not a file format of the new arrival document is a predetermined format when the difference between a date/time upon receipt of the FAX reception notification in the notification reception step and a date/time upon creation of the new arrival document included in the FAX reception notification is equal to or less than a predetermined threshold value, and the telephone number included in the FAX reception notification is set as a property of the new arrival document when the file format of the new arrival document is the predetermined format.

10. The property setting method according to claim 9, wherein, in the setting step, it is determined whether or not a file name of the new arrival document satisfies a predetermined condition when a file format of the new arrival document is a predetermined format, and the telephone number included in the FAX reception notification is set as a property of the new arrival document when the file name of the new arrival document satisfies the predetermined condition.

11. A non-transitory computer readable storage medium on which is stored a computer program for making a computer execute:

receiving, in a notification reception processing, a FAX reception notification which is a notification indicating the reception of FAX data from an image forming apparatus for storing the received FAX data as a document in a storage unit and includes at least a telephone number of a transmission source of the FAX data;

determining, in a new arrival determination processing, whether or not a new arrival document is present in the storage unit when the FAX reception notification is received; and displaying, in a setting processing, the FAX reception notification when it is determined that a new arrival document is absent in the storage unit or setting the telephone number included in the FAX reception notification as a property of the new arrival document when it is determined that a new arrival document is present in the storage unit, wherein, in the setting processing, a query is made to a user of the information processing apparatus as to whether or not the telephone number included in the FAX reception notification is set as a property of the new arrival document when it is determined in the new arrival determination processing that a new arrival document is present in the storage unit, and the telephone number is set as a property of the new arrival document depending on the results of the query.

12. The non-transitory computer readable storage medium according to claim 11, wherein, in the new arrival determination processing, it is periodically determined whether or not a new arrival document is present in the storage unit, and wherein, when it is determined in the new arrival determination processing that the new arrival document is present in the storage unit, the telephone number included in the FAX reception notification is set as a property of the new arrival document in the setting processing using the determination as a trigger.

13. The non-transitory computer readable storage medium according to claim 11, wherein the FAX reception notification further includes a created date/time which is a date/time upon creation of the FAX data corresponding to the FAX reception notification as a document, and wherein, in the setting processing, it is further determined whether or not a difference between a date/time upon receipt of the FAX reception notification in the notification reception processing and a date/time upon creation of the new arrival document included in the FAX reception notification is equal to or less than a predetermined threshold value when it is determined in the new arrival determination processing that the new arrival document is present in the storage unit, and the telephone number included in the FAX reception notification is set as a property of the new arrival document when the difference between a date/time upon receipt of the FAX reception notification and a date/time upon creation of the new arrival document is equal to or less than the threshold value.

14. The non-transitory computer readable storage medium according to claim 13, wherein, in the setting processing, it is determined whether or not a file format of the new arrival document is a predetermined format when the difference between a date/time upon receipt of the FAX reception notification in the notification reception processing and a date/time upon creation of the new arrival document included in the FAX reception notification is equal to or less than a predetermined threshold value, and the telephone number included in the FAX reception notification is set as a property of the new arrival document when the file format of the new arrival document is the predetermined format.

15. The non-transitory computer readable storage medium according to claim 14, wherein, in the setting processing, it is determined whether or not a file name of the new arrival document satisfies a predetermined condition when a file format of the new arrival document is a predetermined format, and the telephone number included in the FAX reception notification is set as a property of the new arrival document when the file name of the new arrival document satisfies the predetermined condition.

* * * * *